United States Patent [19]
Martin

[11] 3,835,338

[45] Sept. 10, 1974

[54] ELECTRICALLY CONTROLLED ULTRA-MICROMANIPULATOR

[76] Inventor: A. Robert Martin, 9172 E. Tufts Cir., Englewood, Colo. 80110

[22] Filed: Aug. 23, 1973

[21] Appl. No.: 390,846

[52] U.S. Cl.................... 310/8.6, 310/8.1, 310/8.3, 318/116
[51] Int. Cl............................................. H04r 17/00
[58] Field of Search.......... 310/8, 8.1, 8.3, 8.5, 8.6, 310/26; 318/116, 118

[56] References Cited
UNITED STATES PATENTS
1,760,198  5/1930  Hough .......................... 310/8.6 X
2,325,238  7/1943  Flint ............................. 310/8.6 X
3,292,019  12/1966  Hsu et al........................ 310/8.5

OTHER PUBLICATIONS
IBM Technical Disclosure Bulletin, Vol. 15, No. 12, May 1973, pp. 3,889, Frictionless X, Y, Z and Theta Micropositioning Table by J. Aronstein & L. W. Holmstrom.

Primary Examiner—Mark O. Budd
Attorney, Agent, or Firm—John E. Reilly

[57] ABSTRACT

An electrically controlled ultra-micromanipulator utilizes three sets of electrostrictive elements arranged in mutually perpendicular relationship and interconnected to selectively move a probe or other object in a three-dimensional pattern. In the disclosed embodiment, two sets of the electrostrictive elements establish pivotal movement about mutually perpendicular axes and the third set of electrostrictive elements establish linear movement in a direction perpendicular to the pivotal axes of the other two sets of elements. The elements establishing the linear movement are arranged in pairs adapted to flex in opposite directions upon an applied potential so that the probe or other object moves along a linear path.

12 Claims, 7 Drawing Figures

3,835,338

ELECTRICALLY CONTROLLED ULTRA-MICROMANIPULATOR

BACKGROUND OF THE INVENTION

The present invention relates generally to apparatus for effecting three-dimensional movement of objects and more particularly relates to electrically controlled apparatus for three-dimensional manipulation of an electrical probe or dissecting tool used in microscopic work.

When working with microscopic matter, manual manipulation does not afford the sensitivity needed, since even the finest touch will produce movements in excess of that required. Accordingly, many devices for precision displacement of probes and other objects used in microscopic work are numerous in the art. The primary requirement of these devices is, of course, remote control and normally this is achieved with hydraulically or pneumatically driven parts which are usually limited in accuracy to about one micrometer.

SUMMARY OF THE INVENTION

It is an object of the present invention to provide a new and improved electrically controlled apparatus for manipulating a probe or other object in a three-dimensional pattern.

It is another object of the present invention to provide a device for electrically manipulating a probe or other object in a three-dimensional pattern with precision of 0.1 micrometer or better.

It is another object of the present invention to provide an electrically controlled ultra-micromanipulator for an electrical probe or dissecting tool used in microscopic work which utilizes electrostrictive material and which is constructed and arranged as to advance the probe along a linear path in at least one direction of movement.

It is still another object of the present invention to provide a new and improved means for reciprocally moving a probe along a linear path through utilization of electrostrictive elements.

The present invention is directed to a novel method and means for imparting closely controlled three-dimensional movement to an electrical probe, dissecting tool or the like with extreme accuracy and wherein the movement is controlled by potentials of continuously variable magnitude applied to three sets of electrostrictive elements oriented at right angles to each other. In the preferred embodiment, the present invention has a first set of electrostrictive elements which are pivotal about a first axis with the first set of elements carrying on their free ends a connecting block for a second set of elements which are pivotal about a second axis normal to the first axis. The second set of elements, in turn, support on their free ends a linear actuating assembly which includes a third set of electrostrictive elements. The third set of elements are uniquely employed to move the electrical probe or the like along a linear path normal both to the pivotal axes of the first and second sets of elements.

The linear actuating assembly includes two pair of electrostrictive elements which are oppositely polarized upon the application of a given potential to effect linear movement of a mounting plate upon which the electrical probe or the like is mounted. By utilizing oppositely polarized elements, the extent of the longitudinal movement of the probe is optimized in order to realize the highest degree of accuracy in manipulating the probe.

DESCRIPTION OF THE DRAWING

Other objects, advantages and capabilities of the present invention will become more apparent as the description proceeds, taken in conjunction with the accompanying drawings, in which.

DESCRIPTION OF THE PREFERRED EMBODIMENT

Figure 1:
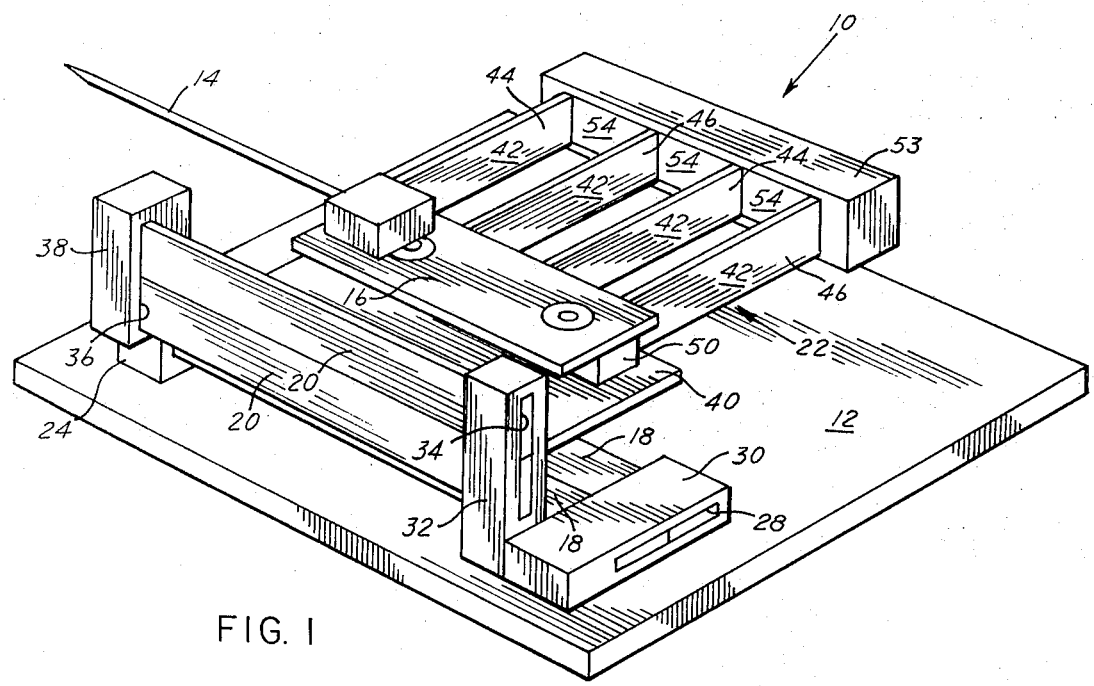
FIG. 1 is a perspective view of a preferred form of electromanipulation, in accordance with the present invention.

The ultra-micromanipulator 10 of the present invention is seen in FIG. 1 to be mounted on a base plate 12; and for purposes of illustration, an electrical probe 14 is mounted on a carrier plate 16 for three-dimensional movement. The apparatus is seen to have a first set of electrostrictive elements 18 adapted to pivotally move the electrical probe about a horizontal axis, a second set of electrostrictive elements 20 adapted to pivotally move the probe about a vertical axis, and a linear actuating assembly 22 adapted to effect linear movement of the probe 14 along its longitudinal axis. The electrostrictive elements are preferably elongated flattened bars of piezoelectric or bi-metallic material which normally remain in a straight condition but undergo a predetermined flex upon the application of a potential between the external faces of the elements. An example of such an electrostrictive element would be a "Bender Bimorph" manufactured by Vernitron Piezoelectric Division of Bedford, Ohio, which consists of two layers of lead-zirconium titanate ceramic separated by a conductor so that an applied voltage between the external faces causes the bar to bend.

Figure 2:
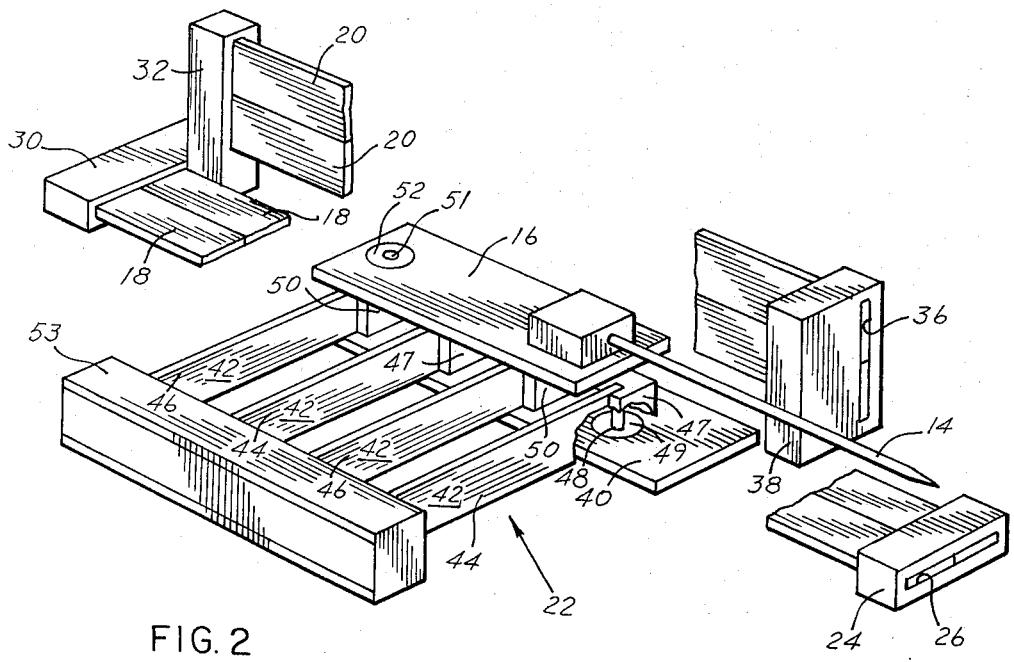
FIG. 2 is a partially exploded perspective view, with portions removed for clarity, viewed from the rear of the preferred form of apparatus.
Figure 3:
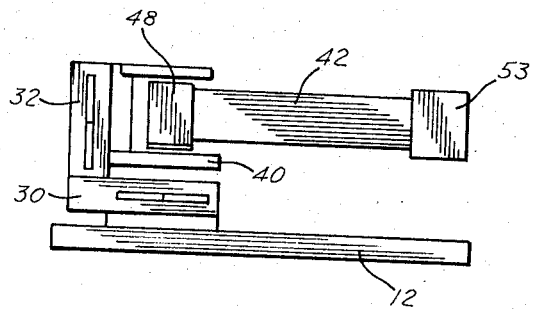
FIG. 3 is a side elevation of the apparatus of FIGS. 1 and 2, FIGS. 4a, 4b and 4c are diagrammatic top plan operational views of the apparatus of FIGS. 1 to 3.

As seen best in FIGS. 1 and 2, the first set of electrostrictive elements 18 are disposed in co-planar, edge-to-edge relationship in a horizontal plane so as to flex in a vertical direction when a potential is placed thereacross. One end of each of the elements 18 is received in an elongated mounting block 24 secured to the top face of the base plate 12. While the electrostrictive elements 18 could be connected to the mounting block in any suitable manner, for purposes of the present disclosure, they are received in a horizontal slot 26 in the mounting block 24 and bonded therein by a suitable adhesive. The opposite free ends of the first set of electrostrictive elements are received in a horizontal slot 28 in a movable horizontally oriented connecting block 30 retained in spaced relationship from the base plate by the first set of electrostrictive elements 18. Again, the electrostrictive elements 18 would be bonded in the slot 28 so as to be immovable relative thereto.

The second set of electrostrictive elements 20 are disposed in co-planar, edge-to-edge relationship in a vertical plane adjacent to one side of the first pair of elements 18 so as to flex in a horizontal direction when a potential is placed thereacross. One end of each of the elements 20 is anchored in a vertically oriented elongated connecting block 32 which is secured in any suitable manner to the connecting block 30 receiving the free ends of the first set of elements 18. The connecting block 32 has a vertical slot 34 therein in which the associated ends of the second set of electrostrictive elements 20 are suitably bonded. The second set of electrostrictive elements have their opposite free ends received in a vertical slot 36 in a connecting block 38 which is disposed in spaced substantially vertical alignment with the mounting block 24 for the first set of elements 18.

As mentioned previously, when an electrical potential is placed between the external faces of the electrostrictive elements, they will flex in a predetermined direction depending upon the polarity of the potential, causing their free ends to pivot and move along an arcuate path. It is therefore apparent that the first set of electrostrictive elements 18 will pivot about a horizontal axis which is parallel to the longitudinal axis of the mounting block 24 for the first set of electrostrictive elements 18, and the second set of electrostrictive elements 20 will pivot about a vertical axis which is parallel to the longitudinal axis of the connecting block 32. Since the connecting block 38 pivots with the free ends of the first set of elements 18 about a horizontal axis and with the free ends of the elements 20 about a vertical axis, it is pivotal about both vertical and horizontal axes.

Referring now to the linear actuating asssembly 22, it can be seen to include a rectangular horizontal mounting plate 40 which is in parallel overlying relationship with the first set of electrostrictive elements 18 so as to underlie the connecting block 38 at the free ends of the second set of electrostrictive elements 20. The mounting plate 40 is bonded to the bottom of the connecting block 38 so that it is caused to move with the connecting block 38 in pivotal movement about horizontal and vertical axes. The third set of electrostrictive elements 42 are seen to be in parallel horizontally spaced relationship and oriented in vertical planes so as to flex upon an applied potential in a horizontal plane. As will be explained more clearly later, the electrostrictive elements 42 in the third set consist of two pairs of elements 44 and 46 which are electrically energized to have opposite polarities so as to effect opposite flexing. The electrostrictive elements in one pair 44 are alternated with the elements in the other pair 46 so that each successive element will flex in an opposite direction with a particular applied potential. Each of the elements 44 in a third set has its innermost end secured, as with a bonding medium, in a vertical slot in a pivotal block 47 carrying a depending vertical pivot shaft 48 which is press-fitted into the center of a ball bearing 49 anchored in the horizontal plate 40. The innermost end of each of the elements 46 is secured, as with a bonding medium, in a vertical slot in a mounting block 50 having an upwardly extending vertical pivot shaft 51 press-fitted into the center of a ball bearing 52 anchored in the carrier plate 16. Accordingly, the innermost end of each of the elements in the third set is pivotal about a vertical axis with the elements 44 being pivotally connected to the mounting plate and the elements 46 pivotally connected to the carrier plate 16. The outermost ends of the elements 42 in the third set are securely received in a recess in a yoke member 53, and conductive metallic spacer blocks 54 press-fitted in the yoke member maintain the ends of the elements 42 in spaced relationship. The yoke member 53 is thereby suspended by the elements in spaced relationship from the base plate 12 of the apparatus 10 so as to be freely movable in a horizontal plane above the base plate.

Figure 4A:
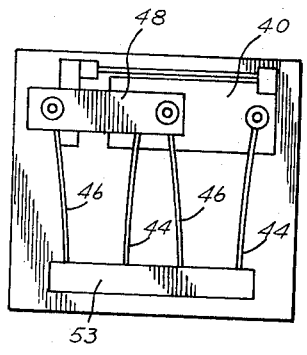
Figure 4B:
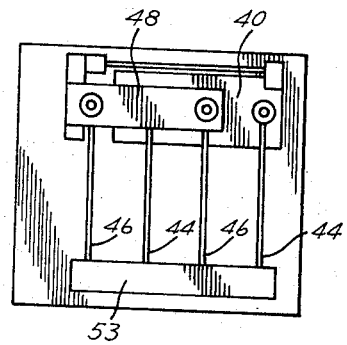
Figure 4C:
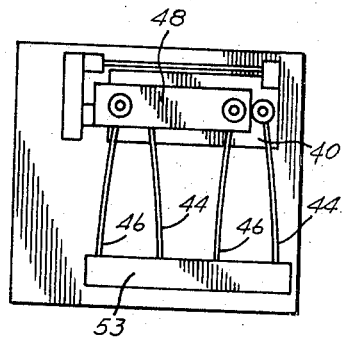

Reference is made to FIGS. 4a, 4b and 4c for an understanding of the operation of the linear actuating assembly 22 and it will there be seen that when the electrostrictive elements 42 are in their neutral straight position, the carrier plate 16 is positioned at a predetermined location relative to the underlying mounting plate 40. When, for example, as shown in FIG. 4a, a positive potential is placed across the elements in one direction, the elements 46 will flex to become concave to the left and the elements 44 will flex to become concave to the right, thereby causing the yoke member 53 to be displaced to the left relative to the mounting plate and the carrier plate 16 to the left relative to the yoke member. All four of the electrostrictive elements 42 in the third set flex equivalent amounts so that the carrier plate 16 remains in parallel relationship with the mounting plate 40 and the yoke member 53 is caused to be drawn inwardly a slight amount toward the carrier plate due to the flexing. When an opposite potential is applied across the electrostrictive elements in the same direction, as illustrated in FIG. 4c, the elements 46 will flex to become concave to the right and the elements 44 will flex to become concave to the left. Accordingly, the yoke member 53 will shift to the right relative to the mounting plate 40 and the carrier plate 16 will shift to the right relative to the yoke member 53, again causing a linear longitudinal movement of the carrier plate and consequently the probe 14.

It can be appreciated that with the apparatus of the present invention, the probe 14 is pivotal about both horizontal and vertical axes and is also linearly movable along its longitudinal axes providing complete three-dimensional versatility.

Figure 5:
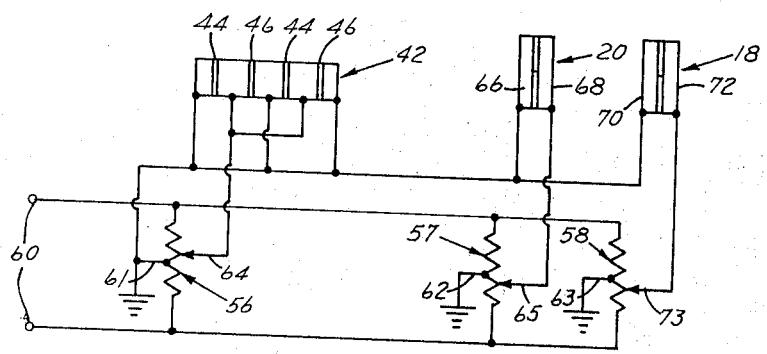
FIG. 5 is a schematic electrical control diagram of the apparatus of FIG. 1.

While the electrical connections for the apparatus have not been shown, the wiring would be connected to the various electrostrictive elements in a conventional manner shown in FIG. 5. It is there seen that three potentiometers, 56, 57 and 58 are connected across a suitable power source 60 with each potentiometer having a grounded center tap 61, 62 and 63, respectively. The center tap 61 and a slide member 64 of potentiometer 56 are connected to the electrostrictive elements 42 of the third set so that the slide member potential is applied to one face of the elements 44 and to the opposite face of the elements 46. The center tap 61, which is grounded, is connected to the face of each element which does not have a potential applied thereto, so that the elements 44 will be caused to flex in an opposite direction from the elements 46 since the potential drop across the faces of the respective elements will be in opposite directions. The direction of flex, of course, is determined by the side of the center tap 61 on which the slide member is located and the degree of flex is determined by the potential value.

One side 66 of the electrostrictive elements 20 in the second set is also connected to ground with the opposite side 68 connected to a slide member 64 of the potentiometer 57 associated with the second set of electrostrictive elements 20 and again the direction of flex of the elements in the second set would be determined by the side of the center tap 62 on which the slide member 65 is located.

Similarly, the first set of electrostrictive elements 18 has one face 70 connected to ground and that opposite face 72 connected to a slide member 73 of the potentiometer 58 associated with the first set of elements 18. In each instance, it will be seen that the degree or amount of flex will be determined by the potential drop across the element and this potential drop is infinitely variable within a predetermined range so that the electrical probe on the apparatus is movable in three dimensions and in finite increments which in the disclosed embodiment has been in the area of approximately 0.1 micrometer.

It will be appreciated that the apparatus 10 provides pivotal movement about two mutually perpendicular axes and linear movement along a line normal to both of the pivotal axes and this arrangement has been found to be well suited for manipulation of an electrical probe used under a high-magnification microscope. One concept of the present invention, however, would also be useful in the manipulation of a specimen carrier wherein pivotal movement of the carrier was not desired but rather linear movement in three mutually perpendicular planes. For such an arrangement, the aforedescribed linear actuating assembly 22 could be utilized in three mutually perpendicular orientations so that the desired three-dimensional linear movement of the specimen carrier would be effected.

Although the present invention has been described with a certain degree of particularity, it is understood that the present disclosure has been made by way of example and that changes in details of structure may be made without departing from the spirit thereof.

What is claimed is:

1. An electrically controllable apparatus for imparting three-dimensional movement to an object supported by a carrier member of the apparatus comprising in combination:
   a first electrostrictive element, support means supporting the first element at one end for flexing movement in a first plane when an electrical potential is placed thereacross and first movable connection means mounted on the opposite end of the first element,
   a second electrostrictive element supported at one end in said first connection means for flexing movement in a second plane normal to said first plane when an electrical potential is placed thereacross and second connection means mounted on the opposite end of said second element, and
   a linear actuating assembly having a mounting member secured to said second connection means for movement therewith, third and fourth electrostrictive elements adapted to flex in opposite directions when an electrical potential is placed thereacross said third and fourth electrostrictive elements, each having a common end thereof connected to a movable yoke member, the opposite end of said third element being connected to said mounting member, a carrier element disposed in parallel relationship to said mounting member, and the opposite end of said fourth member being connected to the carrier element to impart linear sliding movement to the carrier member relative to said mounting member when the third and fourth electrostrictive elements are flexed in opposite directions.

2. The electrically controllable apparatus of claim 1 wherein said electrostrictive elements are flattened bars with the first element being normal to the second element and the third and fourth elements being parallel to each other and normal to the first and second elements.

3. The electrically controllable apparatus of claim 2 further including a base plate and wherein said support means comprises a block anchored to said base plate.

4. The electrically controllable apparatus of claim 3 wherein said first connection means is supported in spaced relationship from said base plate by said first element.

5. The electrically controllable apparatus of claim 4 wherein said second connection means is supported in spaced relationship from said base plate by the second element.

6. The electrically controllable apparatus of claim 5 wherein said third element is pivotally connected to said mounting member and wherein said fourth element is pivotally connected to said carrier member.

7. The electrically controllable apparatus of claim 6 wherein said yoke member is spaced from said base plate.

8. In an electrically controllable apparatus for imparting linear movement to an object supported by a carrier member of the apparatus, a linear actuating mechanism comprising in combination:
   a mounting base,
   a first electrostrictive element, means pivotally connecting the first element at one end to the mounting base and adapted to flex in a first direction when an electrical potential is placed thereacross,
   a carrier member disposed in parallel relationship with the mounting base,
   a second electrostrictive element disposed in spaced parallel relationship with said first element and adapted to flex in a second opposite direction to said first direction when a potential is placed thereacross, means pivotally connecting one end of the second element to the carrier member, and
   a movable yoke member connected to the opposite ends of said first and second elements whereby when an electrical potential is placed across said first and second elements, causing the elements to flex in opposite directions, the carrier member will shift linearly relative to the mounting base.

9. In the electrically controllable apparatus of claim 8 wherein said first and second elements are flattened bars and wherein each of said means pivotally connecting the one end of the first and second elements to the mounting base and carrier member respectively are block members each having a slotted recess to receive the one end of the associated element and a pivot shaft.

10. In the electrically controllable apparatus of claim 9 wherein said mounting base and carrier member each have a bearing portion pivotally receiving the pivot shaft of the block member associated therewith.

11. In the electrically controllable apparatus of claim 8 further including a third electrostrictive element disposed in spaced parallel relationship with said first and second elements, means pivotally connecting the third electrostrictive element at one end to the mounting base, said third element being adapted to flex in said first direction along with the first element when an electrical potential is placed thereacross, said third element having its opposite end connected to the yoke member, and a fourth electrostrictive element disposed in spaced parallel relationship with said first, second and third elements, means pivotally connecting one end of the fourth element to the carrier member, said fourth element being adapted to flex in said second direction along with the second element when an electrical potential is placed thereacross, and said fourth element having its opposite end connected to the yoke member.

12. An electrically controllable apparatus for imparting three-dimensional microscopic movement to a probe supported by a carrier plate of the apparatus comprising in combination:

a base plate, a mounting block anchored to the base plate and having a horizontal slotted opening therein, a first pair of flat electrostrictive bars disposed in co-planar, edge-to-edge relationship in a horizontal plane and adapted to flex in a vertical direction when an electrical potential is placed thereacross, one end of said first pair of bars being secured in said slotted opening in the mounting block, a first connecting block disposed in spaced relation from the base plate and having a horizontal and vertical slotted opening therein, the opposite ends of said first pair of bars being secured in the horizontal slotted opening in the first connecting block, a second pair of flat electrostrictive bars disposed in co-planar, edge-to-edge relationship in a vertical plane and adapted to flex in a horizontal direction when an electrical potential is placed thereacross, one end of said second pair of bars being secured in said vertical slotted opening in the first connecting block, a second connecting block disposed in spaced relation from the base plate and having a vertical slotted opening therein in which the opposite ends of the second pair of bars are secured, a horizontal mounting plate secured to the second connecting block having a pair of spaced bearings therein, a carrier plate disposed in vertically spaced parallel relationship with the mounting plate and having an elongated parallel probe secured thereto, and a pair of spaced bearings therein which are staggered relative to the bearing in the mounting plate, third and fourth pairs of flat electrostrictive bars in horizontally spaced relationship and adapted to flex in a horizontal plane, said third pair of bars being adapted to flex in an opposite direction to said fourth pair of bars when an electrical potential is placed thereacross, a pivot block secured on one end of each of the bars in the third and fourth pairs with the blocks on the third pair of bars having pivot rods pivotally received in the bearings on the mounting plate and the blocks on the fourth pair of bars having pivot rods pivotally received in the bearing on the carrier plate, and a yoke member spaced from the base plate and receiving the opposite ends of the bars in the third and fourth pairs whereby when an electrical potential is placed across the third and fourth pairs of bars, the elongated probe will be caused to move in a linear horizontal direction, when an electrical potential is placed across the second pair of bars the probe will be caused to pivot in a horizontal direction, and when an electrical potential is placed across the first pair of bars the probe will be caused to pivot in a vertical direction.

* * * * *